(12) United States Patent
Sigoure et al.

(10) Patent No.: US 12,210,493 B2
(45) Date of Patent: Jan. 28, 2025

(54) OPTIMIZING STORAGE OF DATA IN ROW-ORIENTED DATA STORAGES

(71) Applicant: Arista Networks, Inc., Santa Clara, CA (US)

(72) Inventors: Benoit Sigoure, Lyons (FR); Michael Fink, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 37 days.

(21) Appl. No.: 18/056,643

(22) Filed: Nov. 17, 2022

(65) Prior Publication Data

US 2024/0168929 A1 May 23, 2024

(51) Int. Cl.
*G06F 16/21* (2019.01)
*G06F 16/22* (2019.01)

(52) U.S. Cl.
CPC .......... *G06F 16/213* (2019.01); *G06F 16/221* (2019.01); *G06F 16/2282* (2019.01)

(58) Field of Classification Search
CPC ... G06F 16/213; G06F 16/221; G06F 16/2282
See application file for complete search history.

(56) References Cited

U.S. PATENT DOCUMENTS 10,558,661 B2 * 2/2020 Merker ............ G06F 16/24554
10,671,641 B1 * 6/2020 Holenstein ............ G06F 16/284

| | | | | |
|---|---|---|---|---|
| 2009/0248724 A1* | 10/2009 | Bhattacharjee | ..... | G06F 16/9024 |
| 2018/0121135 A1* | 5/2018 | Lee | .......... | G06F 3/067 |
| 2018/0358989 A1* | 12/2018 | Mehra | ............... | H03M 13/2918 |
| 2021/0112009 A1* | 4/2021 | Takashige | ........... | H04L 41/0213 |

OTHER PUBLICATIONS

Dageville et al., "The Snowflake Elastic Data Warehouse", retrieved on Apr. 2, 2024 from http://dx.doi.org/10.1145/2882903.2903741, 12 pgs.
Leis et al., "The Adaptive Radix Tree: ARTful Indexing for Main-Memory Databases", Fakultät für Informatik Technische Universität München Boltzmannstrae 3, D-85748 Garching, retrieved Apr. 2, 2024 from https://db.in.tum.de/~leis/papers/ART.pdf, 12 pgs.

* cited by examiner

*Primary Examiner* — Loc Tran
(74) *Attorney, Agent, or Firm* — Fountainhead Law Group, PC

(57) ABSTRACT

Embodiments of the present disclosure include techniques for optimizing storage of data in row-oriented data storages. A block of data comprising a plurality of rows of data. Each row of data comprises a set of values for a set of attributes. A set of unique schemas is determined based on the plurality of rows of data. A set of groups of rows of data is determined based on the set of unique schemas. For each group of rows of data in the set of groups of rows of data, the group of rows of data is stored in a column-oriented format. For each group of rows of data in the set of groups of rows of data, a set of encoding techniques are applied to values in the group of rows of data based on the sets of attributes of the group of rows of data.

21 Claims, 8 Drawing Sheets

OPTIMIZING STORAGE OF DATA IN ROW-ORIENTED DATA STORAGES

BACKGROUND

Databases are typically used to store data in an organized manner and allow the data to be accessed for computing purposes. A database management system (DBMS) is software configured to manage such databases and provide access to clients of the databases (e.g., users, applications, services, computing devices, etc.). One way to organize data in a database is using tables of rows and columns. Each column in a table stores a value for an attribute while each row in a table represents a set of related data (i.e., the values specified in the columns in the row). Generally, there are two main ways in which data are stored in such tables. First, data can be stored using a row-oriented approach. Under such an approach, the data in each row in a table are stored together. A second technique for storing data in tables is a column-oriented approach where data in each column are stored together.

The following detailed description and accompanying drawings provide a better understanding of the nature and advantages of various embodiments of the present disclosure.

DETAILED DESCRIPTION

Figure 1:
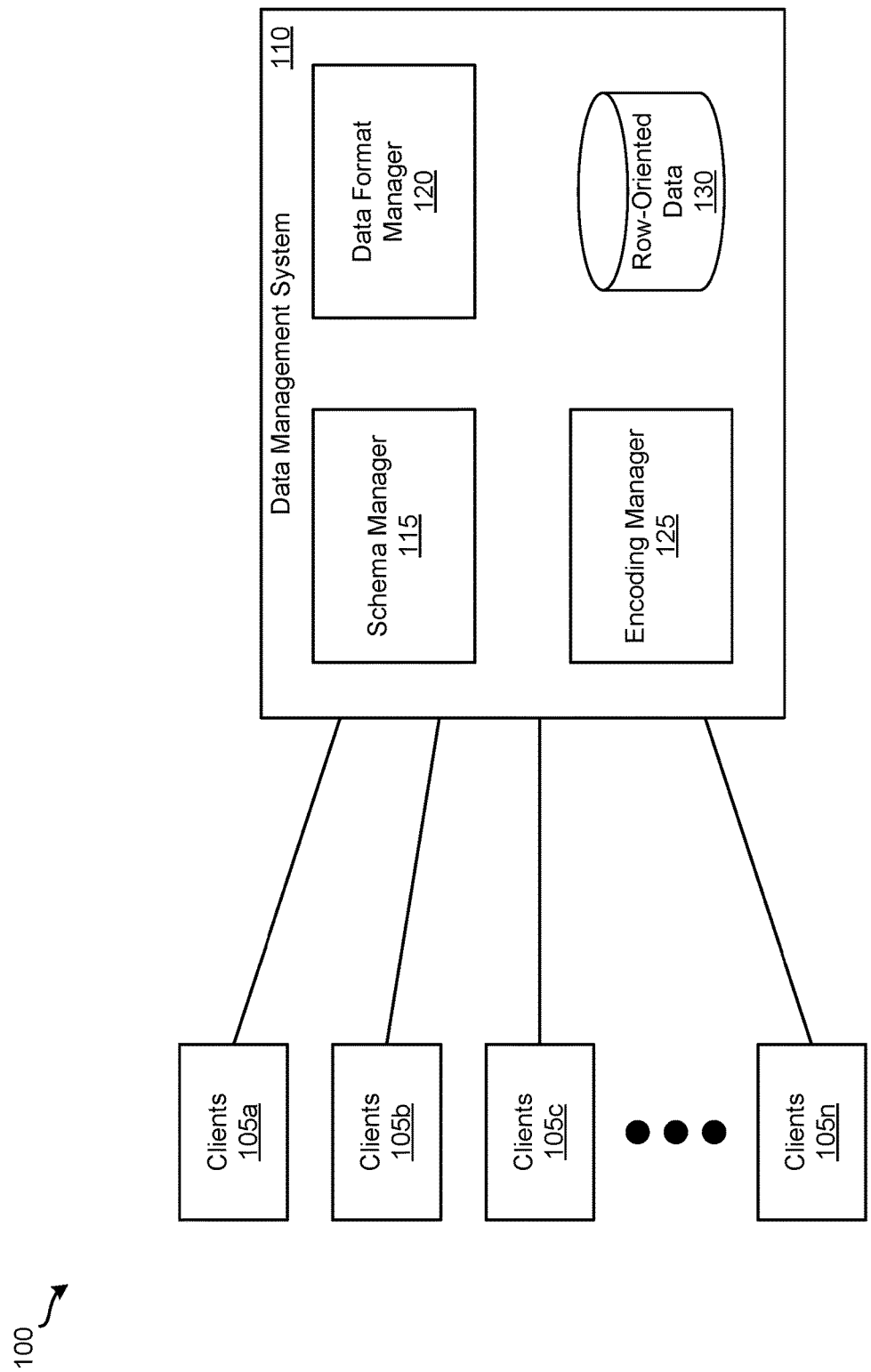
FIG. 1 illustrates a system according to some embodiments.

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for optimizing storage of data in row-oriented data storages. In some embodiments, a data management system that manages row-oriented data storages manages data on a block-by-block basis. For example, when the data management system receives rows of data to store in a data storage, the data management system stores multiple rows of data in a block of data and stores the block in the data storage. When the data management system receives a request for a particular row of data, the data management system determines the block of data in the data storage that includes the particular row of data, reads the block of data from the data storage, identifies the particular row of data from the determined block of data, and then returns the identified particular row of data to the requestor. In some embodiments, the data management system optimizes the way such blocks of data are stored by processing the rows of data that are to be stored in a block of data in a certain manner. For instance, each row of data can be implemented as a key/value pair where the value specifies a set of attributes and a set of values for the set of attributes. Based on the set of attributes of each row of data to be stored in the block of data, the data management system determines a schema associated with the row of data. Then, the data management system groups rows of data that have the same schema together. For each group of rows of data, the data management system stores the values and attributes in a column-oriented format. For each group of rows of data, the data management system may apply different encoding techniques to the values of different attributes based on the type of data of the values in order to further optimize the storage of the values.

The techniques described in the present application provide a number of benefits and advantages over conventional methods for storing data in row-oriented data storages. For example, storing data for a row-oriented data storage in a column-oriented format allows encoding techniques typically applicable to only data stored in a column-oriented manner to be applied to the data for the row-oriented data storage. Such encoding techniques provide better data compression of the data. Conventional ways of storing data in row-oriented data storages prevent such encoding techniques from being used.

There are many possible applications of the techniques described here. For instance, the techniques are particularly useful in applications where multiple entries are stored for the same key, such as when storing network configurations and network telemetry. In these cases, the number of values associated with similar keys and thus with each schema is high. This allows for greater compression of the data and thus greater advantages when transforming between row oriented and column oriented storage.

FIG. 1 illustrates a system 100 according to some embodiments. As shown, system 100 includes clients 105*a-n* and data management system 110. Each of the clients 105*a-n* is configured to interact with data management system 110. For instance, each of the clients 105*a*-n can send data management system 110 requests to access (e.g., read) data stored in row-oriented data storages managed by data management system 110. In response to one such requests, a client 105 may receive the requested data from data management system 110. As another example, each of the clients 105*a-n* may send data management system 110 requests to modify and/or delete data stored in such row-oriented data storages. Each client 105 can be a software application, a software service, a computing device, or any other type of client that is configured to interact with data management system 110.

As illustrated in FIG. 1, data management system 110 includes schema manager 115, data format manager 120, encoding manager 125, and row-oriented data storage 130. Row-oriented data storages 130 is configured to store data in row-oriented databases. In some embodiments, row-oriented data storage 130 is implemented in a single physical storage while, in other embodiments, row-oriented data storage 130 may be implemented across several physical storages. While FIG. 1 shows row-oriented data storage 130 as part of data management system 110, one of ordinary skill in the art will appreciate that row-oriented data storage 130 may be external to data management system 110 in some embodiments.

Figure 2:
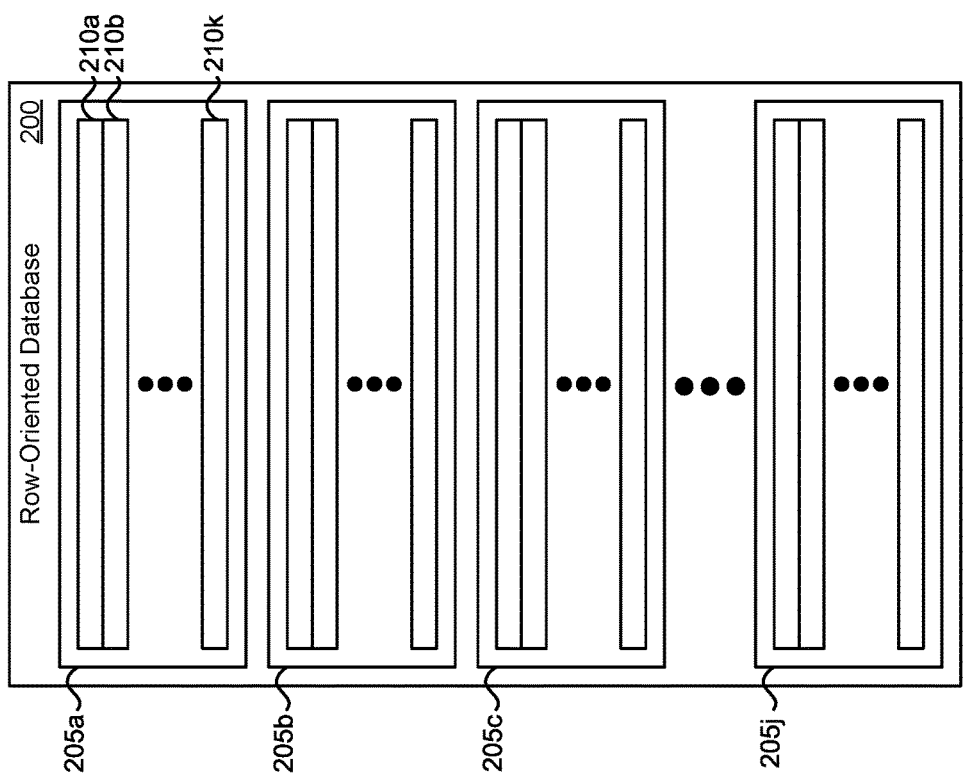
FIG. 2 illustrates an example row-oriented database according to some embodiments.

FIG. 2 illustrates an example row-oriented database 200 according to some embodiments. In some embodiments, row-oriented database 200 can be the type of database stored in row-oriented data storage 130 and managed by data management system 110. As depicted, row-oriented database 200 includes database files 205a-j. Each of the database files 205a-j includes one or more blocks of rows of data. For example, database file 205a includes blocks of rows of data 210a-k.

Figure 3:
FIG. 3 illustrates an example block of rows of data according to some embodiments.

FIG. 3 illustrates an example block of rows of data 300 according to some embodiments. In some embodiments, the structure of the block of rows of data illustrated in row-oriented database 200 may be the same as/similar to the structure shown for block of rows of data 300. As illustrated, block of rows of data 300 includes rows of data 305a-m. Each of the rows of data 305a-n includes a key 310 and a value 315. Each key 310 is used for identifying the corresponding row of data 305. Each value 315 is configured to store a set of values for a set of attributes for the corresponding row of data 305. In some embodiments, each value 315 comprises several columns with a value for each column.

As mentioned above, in some embodiments, the block of rows of data illustrated in row-oriented database 200 can use the same/similar structure as that depicted for block of rows of data 300. In some such embodiments, the blocks of rows of data in each of the database files 205a-j are sorted according to key values. Additionally, each of the database files 205a-j may further include an index on the keys of the rows of data included in the blocks of the database file 205. For example, in some embodiments, the index included in a database file 205 can store the offset of each block of rows of data included in the database file 205 and the first key of each of those blocks of rows of data. This way, when searching for a key in a database file 205, the index included in the database file 205 is loaded and a binary search may be performed on the index in order to find the block of rows of data where the key could be included.

Returning to FIG. 1, schema manager 115 is responsible for managing schemas for row-oriented data that is to be stored in a column-oriented format. For example, schema manager 115 may receive several rows of data from data management system 110 along with a request to determine unique schemas for the rows of data. In response to the request, schema manager 115 determines a set of unique schemas based on the data in the several rows of data (e.g., the attributes specified in each of the several rows of data). After schema manager 115 determines the set of unique schemas, schema manager 115 sends data format manager 120 the several rows of data and the set of unique schemas for further processing.

In some embodiments when determining the set of unique schemas the schema manager 115 may detect that the key contains information that is also stored in the value. For example, the key may be comprised of a set of keys and values itself, these keys also being present in the value. The schema manager 115 may extract the overlapping information into the schema such that the data is only stored in one of the key columns or the attribute columns.

Data format manager 120 is configured to store data arranged in a row-oriented format in a column-oriented format. For instance, when data format manager 120 receives from schema manager 115 several rows of data and the set of unique schemas, data format manager 120 groups the rows of data into a set of groups based on the unique set of schemas. For instance, data format manager 120 can group rows of data having the same unique schema into a separate group. In this fashion, each group of rows of data has the same common schema used to store its data. Next, data format manager 120 stores the data in each group of rows of data in a column-oriented format. Once the groups of rows of data are stored in a column-oriented format, data format manager 120 sends encoding manager 125 the groups of rows of data and the set of unique schemas for further processing.

Encoding manager 125 handles the encoding of data in groups of rows of data. For example, encoding manager 125 can receive groups of rows of data and a set of unique schemas from data format manager 120. In response to receiving this data, encoding manager 125 processes each group of rows of data by determining the data type of values stored in each column of data based on the unique schema associated with the group of rows of data. Based on the type of data values stored in a particular column of data, encoding manager 125 applies a defined encoding technique to encode the column of data. For example, if encoding manager 125 determines that the data type of values stored in a column of data is a numeric value such as an integer, encoding manager 125 can use a run-length encoding technique to encode the values stored in the column of data. As another example, if encoding manager 125 determines that the data type of values stored in a column of data is an enumeration (e.g., a set of possible values), encoding manager 125 can use a dictionary encoding technique to encode the values stored in the column of data. As yet another example, if encoding manager 125 determines that the data type of values stored in a column of data is a timestamp, encoding manager 125 can use a delta or zigzag encoding technique (e.g., differences between timestamps are zigzag encoded) to encode the values stored in the column of data. One of ordinary skill in the art will appreciate that any number of different types of encoding techniques may be employed for any number of different data types. After encoding the data in each group of rows of data, encoding manager 125 stores the encoded data in row-oriented data storage 130 (e.g., as a block of rows of data in a database file of a row-oriented database).

An example operation will now be described by reference to FIGS. 1, 2, and 4-6. In particular, the example operation will demonstrate how data arranged in a row-oriented format are stored in a column-oriented format. The operation begins by data management system 110 determining that a block of rows of data is to be stored in row-oriented data storage 130. In some cases, data management system 110 determines that the block of rows of data is to be stored in row-oriented data storage 130 when data management system 110 is adding blocks of rows of data to a newly created database file that is to be added to a row-oriented database (e.g., creating a database file 205 that is to be added to row-oriented database 200). Data management system 110 may process each block of rows of data that is added to the database file in the manner described in this example operation. In other cases, data management system 110 determines that the block of rows of data is to be stored in row-oriented data storage 130 when data management system 110 is merging several database files into a single database file (e.g., merging several database files 205 into a single database file 205). In such other cases, data management system 110 creates new blocks of rows of data for the single database file from the rows of data in the blocks of rows of data included in the several database files. Data management system 110 can process newly created blocks of rows of data in the manner described in this example operation.

Figure 4:
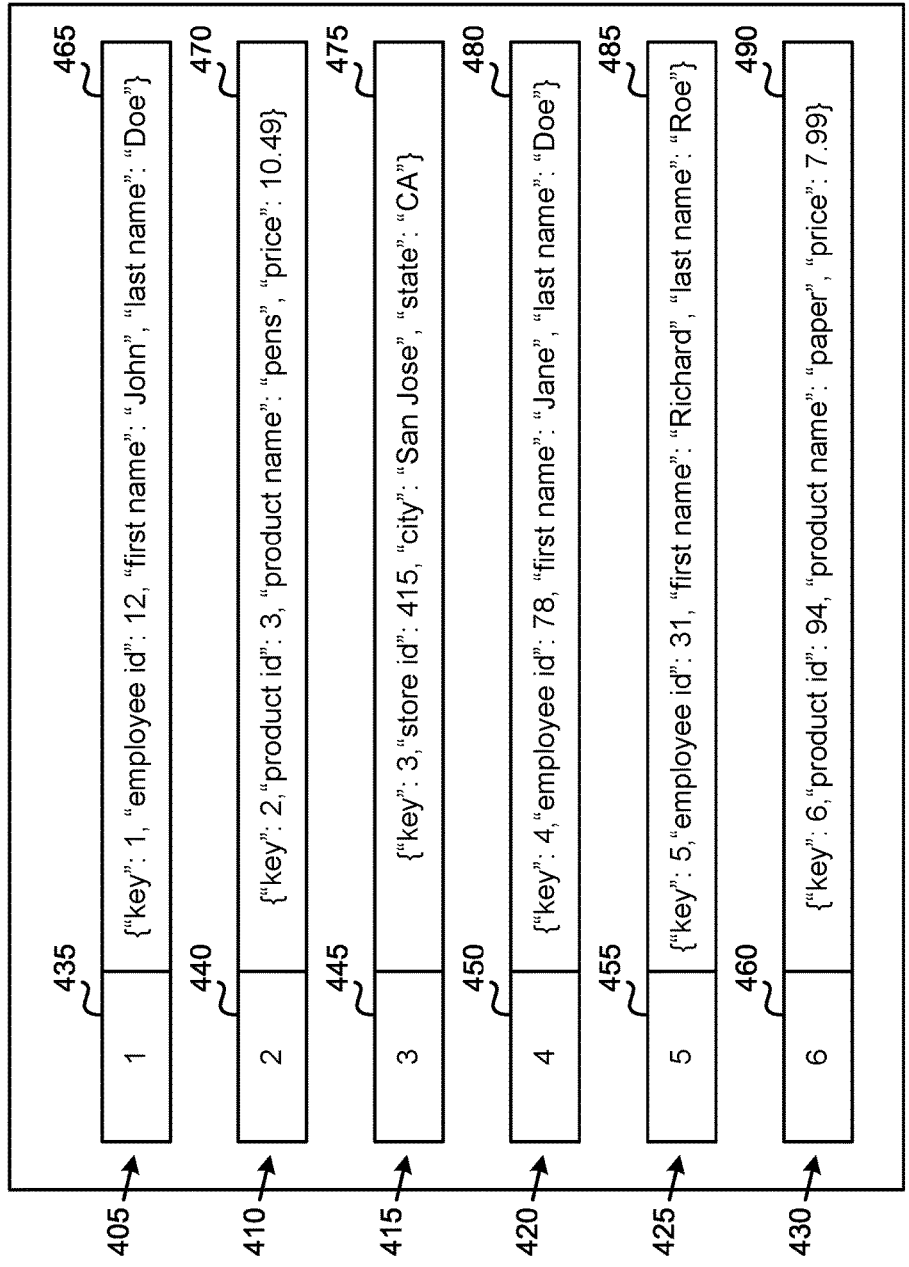
FIG. 4 illustrates another example block of rows of data according to some embodiments.

FIG. 4 illustrates an example block of rows of data 400 according to some embodiments. For this example, block of rows of data 400 is the block of rows of data that data management system 110 determines is to be stored in row-oriented data storage 130. Here, block of rows of data 400 includes rows of data 405-430. Each of the rows of data 405-430 includes a key and a value. As shown, row of data 405 includes key 435 and value 465, row of data 410 includes key 440 and value 470, row of data 415 includes key 445 and value 475, row of data 420 includes key 450 and value 480, row of data 425 includes key 455 and value 485, and row of data 430 includes key 460 and value 490. Each of the keys 435-460 is for identifying the corresponding row of data 405-430. In this example, the value of keys 435-460 are embedded in values 465-490. Each of the values 465-490 stores a set of attributes and a set of values for the set of attributes. For example, value 465 stores a set of attributes that includes "key," "employee id," "first name," and "last name." Value 465 also stores a set of values for the set of attributes that includes a value of 1 for the "key" attribute, a value of 12 for the "employee id" attribute, a value of "John" for the "first name" attribute, and a value of "Doe" for the "last name" attribute. The set of attributes and the set of values for the attributes for the other values 470-490 are expressed in the same way.

After determining that block of rows of data 400 is to be stored in row-oriented data storage 130, data management system 110 sends schema manager 115 block of rows of data 400 and a request to determine unique schemas for the block of rows of data 400. In response, schema manager 115 determine a set of unique schemas based on the data in the several rows of data. Here, schema manager 115 determines the set of unique schemas by iterating through each of the rows of data 405-430 and identifying unique schemas based on the attributes and values specified in values 465-490.

Figure 5:
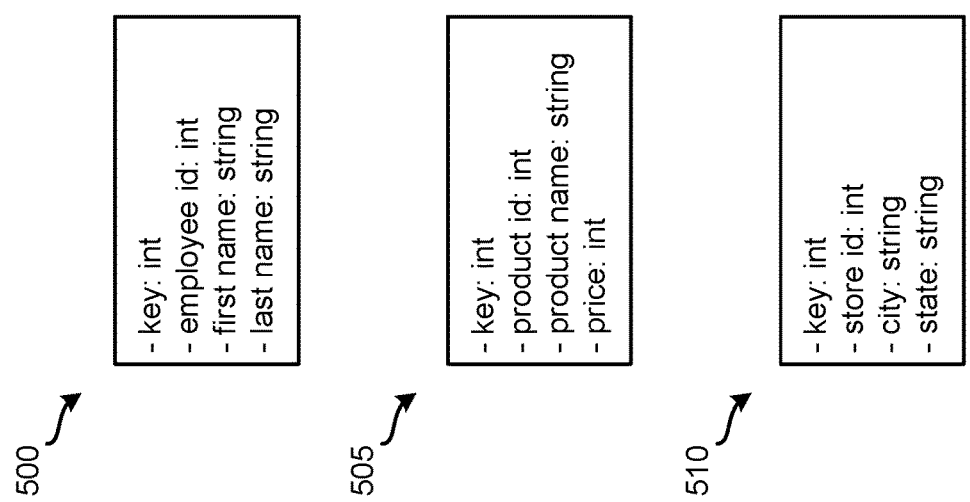
FIG. 5 illustrates schemas determined from the block of rows of data illustrated in FIG. 4 according to some embodiments.

FIG. 5 illustrates schemas 500-510 determined from block of rows of data 400 according to some embodiments. In this example, schema manager 115 determines schemas 500-510 as the set of unique schemas for block of rows of data 400. As depicted in FIG. 5, schema 500 specifies a key id that stores an integer data type, an employee id attribute that stores an integer data type, a first name attribute that stores a string data type, and a last name attribute that stores a string data type. Schema manager 115 determined schema 500 based on value 465 in row of data 405. Since this was the first row of data that schema manager 115 processed, there were no existing schemas. As such, schema manager 115 determined that schema 500 includes each of the attributes specified in value 465. In addition, schema manager 115 determined that the data type of the values for the key attribute is an integer because the value specified for the "key" attribute is a number. Similarly, schema manager 115 determined that the data type of the values for the employee id attribute is an integer because the value specified for the "employee id" attribute is a number. Schema manager 115 determined that the data type of the values for the first name attribute is a string since the value "John" is a string. Schema manager 115 determined the data type of the values for the last name attribute in the same manner.

When schema manager 115 iterates to row of data 410, schema manager 115 determines that the schema for row of data 410 has different attribute names than schema 500 and, thus, is a different schema that does not exist. As such, schema manager 115 generates schema 505, which specifies a product id attribute that stores an integer data type, a product name attribute that stores a string data type, and a price attribute that stores an integer data type. Schema manager 115 determines the data types for these attributes in the same fashion described above (e.g., examining the values of the attributes). Next, schema manager 115 iterates to row of data 415. Here, schema manager 115 determines that the schema for row of data 415 has different attribute names than schemas 500 and 510. Hence, schema manager 115 generates schema 510, which specifies a store id attribute that stores an integer data type, a city attribute that stores a string data type, and a state attribute that stores a string data type. Schema manager 115 determines the data types for these attributes in the same way explained above (e.g., examining the values of the attributes). Then, schema manager 115 iterates to row of data 420. The attribute names specified in row of data 420 and the data types that schema manager 115 determines for the attributes are the same as schema 500. Therefore, schema manager 115 determines that the schema for row of data 420 is the same as schema 500 and proceeds to row of data 425. Here, schema manager 115 determines that the schema for row of data 425 is also the same as schema 500 because the attribute names specified in row of data 425 and the data types that schema manager 115 determines for the attributes are the same as schema 500. Finally, schema manager 115 iterates to row of data 430 and determines that the schema for row of data 430 is the same as schema 505 as the attribute names specified in row of data 430 and the data types that schema manager 115 determines for the attributes are the same as schema 505.

Once schema manager 115 determines the set of unique schemas 500-510, schema manager 115 sends data format manager 120 rows of data 405-430 and the set of unique schemas 500-510. Upon receiving the rows of data 405-430 and the set of unique schemas 500-510, data format manager 120 groups rows of data 405-430 into a set of groups based on the unique set of schemas 500-510. In this example, data format manager 120 groups rows of data having the same unique schema into a separate group. Thus, data format manager 120 groups rows of data 405, 420, and 425 into a first group of rows of data. Then, data format manager 120 groups rows of data 410 and 430 into a second group of rows of data. Lastly, data format manager 120 groups row of data 415 into a third group of rows of data.

Figure 6:
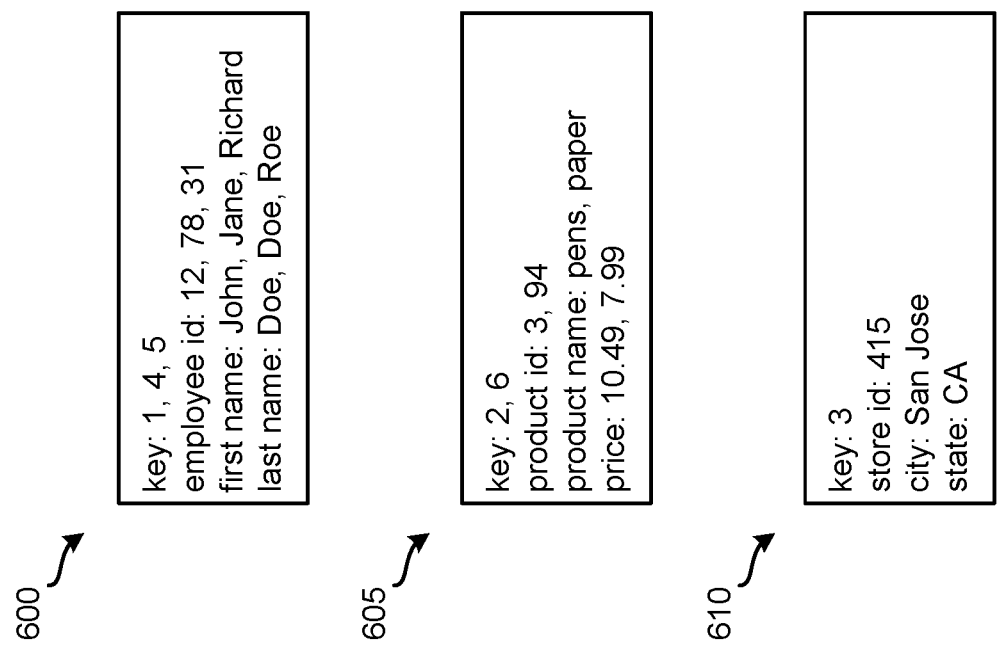
FIG. 6 illustrates the rows of data illustrated in FIG. 4 stored in a column-oriented format according to some embodiments.

After the rows of data 405-430 are grouped, data format manager 120 stores the data in each group of rows of data in a column-oriented format. FIG. 6 illustrates rows of data 405-430 stored in a column-oriented format according to some embodiments. As illustrated, FIG. 6 depicts three sets of data 600-615 that are stored in a column-oriented format. For this example, set of data 600 stores the values specified in keys 405, 420, and 425, and the attributes and values specified in values 465, 480, and 485. Set of data 605 stores the values of keys 440 and 460, and the attributes and values specified in values 470 and 490. Set of data 610 stores the value of key 445, and the attributes and values specified in value 415. After storing the groups of rows of data in a column-oriented format, data format manager 120 sends encoding manager 125 sets of data 600-610 and schemas 500-510.

When encoding manager 125 receives sets of data 600-610 and schemas 500-510, encoding manager 125 processes each group of rows of data by determining the data type of values stored in each column of data based on the unique schema associated with the group of rows of data. Here, encoding manager 125 determines, based on schema 500, the data type of the employee id attribute in set of data 600 to be an integer, the data type of the first name attribute in set of data 600 to be a string, and the data type of the last name attribute set of data 600 to be a string. Encoding manager 125 applies an encoding technique to values in a column of data (e.g., an attribute) based on the encoding technique defined for the data type determined for the column of data. Encoding manager 125 processes set of data 605 based on schema 505 in the same way. Encoding manager 125 does not encode any of the data in set of data 610 as there is only one value in each attribute. Finally, encoding manager 125 stores the encoded set of data 600-610 as block of rows of data 400 in row-oriented data storage 130.

Now, when data management system 110 receives a request to access block of rows of data 400, data management system 110 can reproduce rows of data 405-430 based on encoded sets of data 600-610. Specifically, data management system 110 decodes the values in each column data using the corresponding decoding technique to generate sets of data 600-610. Next, data management system 110 converts the column-oriented format data in set sets of data 600-610 into the row-oriented format of rows of data 405-430. Data management system 110 can then process the request to access block of rows of data 400. In some embodiments, data management system 110 may decode, on the fly, just the requested subset of the block of rows of data.

Figure 7:
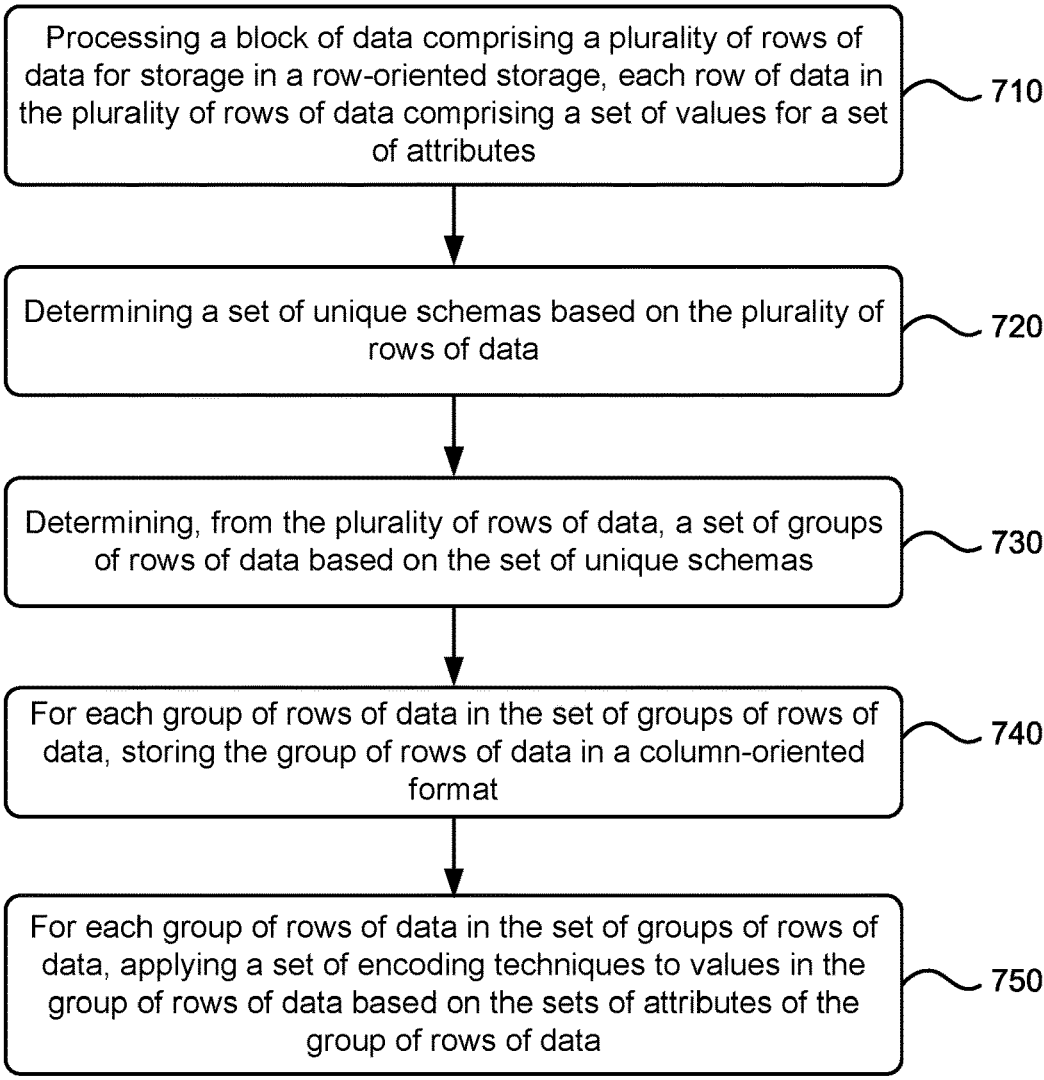
FIG. 7 illustrates a process for optimizing storage of data in row-oriented data storages according to some embodiments.

FIG. 7 illustrates a process 700 for optimizing storage of data in row-oriented data storages according to some embodiments. In some embodiments, data management system 110 performs process 700. Process 700 starts by processing, at 710, a block of data comprising a plurality of rows of data for storage in a row-oriented storage. Each row of data in the plurality of rows of data comprises a set of values for a set of attributes. Referring to FIGS. 1 and 4 as an example, data management system 110 may process block of rows of data 400 in response to determining that block of rows of data 400 is to be stored in row-oriented data storage 130.

Next, process 700 determines, at 720, a set of unique schemas based on the plurality of rows of data. Referring to FIGS. 1, 4, and 5 as an example, schema manager 115 can determine schemas 500-510 by iterating through rows 405-430 in block of rows of data 400 and identifying unique schemas based on the attributes and values for the attributes specified in value portion of the row of data.

At 730, process 700 determines, from the plurality of rows of data, a set of groups of rows of data based on the set of unique schemas. Referring to FIGS. 1, 4, and 5 as an example, data format manager 120 may group rows of data 405-430 into three groups of rows of data based on schemas 500-510. In particular, data format manager 120 groups the rows of data that have the same schema together in the same group: rows of data 405, 420, and 425 are grouped into a first group, rows of data 410 and 430 are grouped into a second group, and row of data 415 is grouped into a third group.

For each group of rows of data in the set of groups of rows of data, process 700 then stores, at 740, the group of rows of data in a column-oriented format. Referring to FIGS. 1, 4, and 6 as an example, data format manager 120 stores the first group of rows of data as set of data 600, stores the second group of rows of data as set of data 605, and stores the third group of rows of data as set of data 610. Sets of data 600-610 each stores the data in the corresponding group of rows of data in a column-oriented format.

Finally, for each group of rows of data in the set of groups of rows of data, process 700 applies, at 750, a set of encoding techniques to values in the group of rows of data based on the sets of attributes of the group of rows of data. Referring to FIGS. 1, 5, and 6 as an example, encoding manager 125 determines the data type of values stored in each column of data based on the unique schema associated with the group of rows of data and applies an encoding technique to values in a column of data (e.g., an attribute) based on the encoding technique defined for the data type determined for the column of data.

Figure 8:
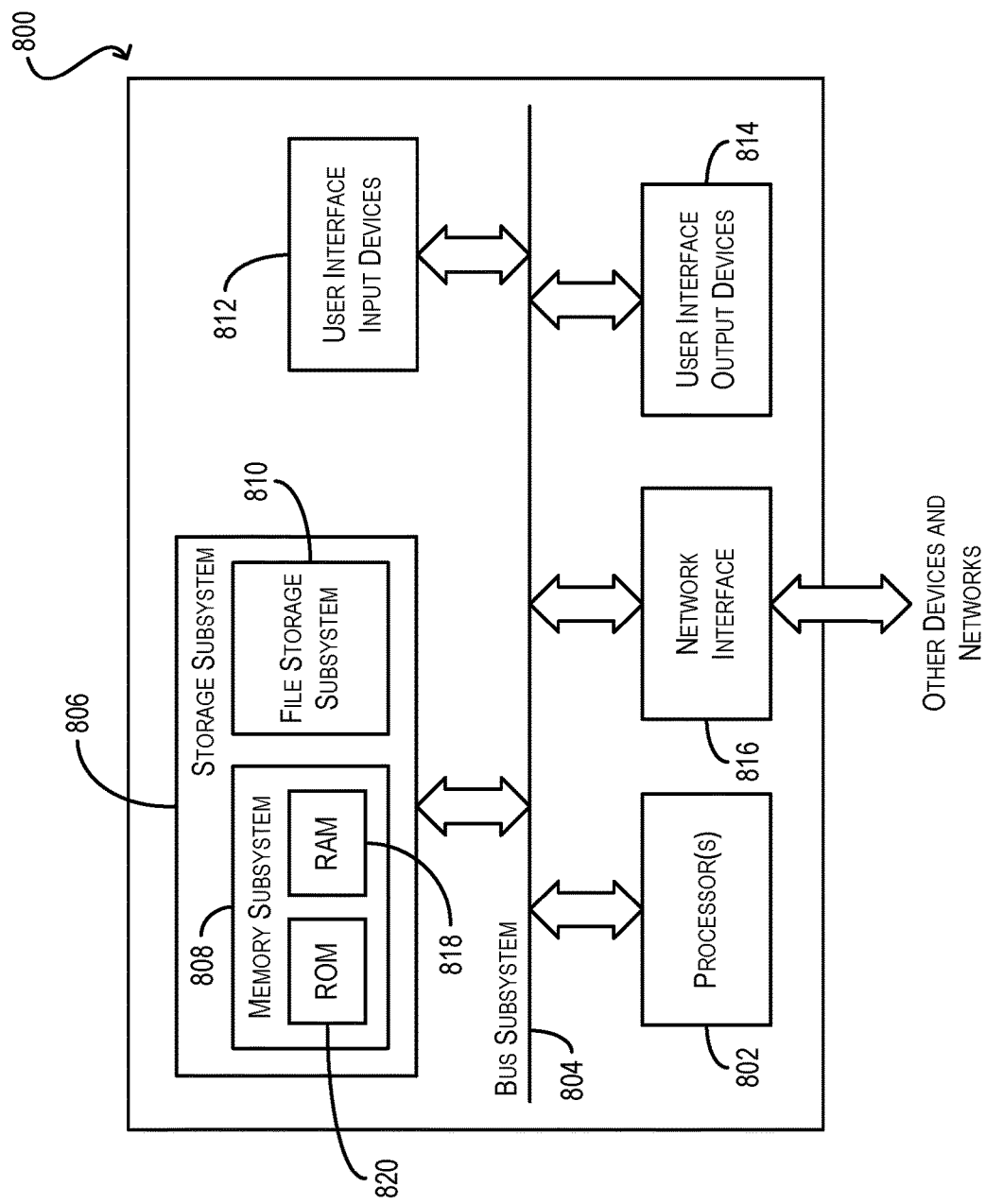
FIG. 8 depicts an example computer system according to an embodiment.

FIG. 8 depicts an example computer system 800 according to some embodiments. In some embodiments, computer system 800 may be used to implement clients 105a-n and data management system 110.

As shown in FIG. 8, computer system 800 includes one or more CPUs 802 that communicate with a number of peripheral devices via a bus subsystem 804. These peripheral devices include a storage subsystem 806 (comprising a memory subsystem 808 and a file storage subsystem 810), user interface input devices 812, user interface output devices 814, and a network interface subsystem 816.

Bus subsystem 804 provides a mechanism for letting the various components and subsystems of computer system 800 communicate with each other as intended. Although bus subsystem 804 is shown schematically as a single bus, alternative embodiments of the bus subsystem can utilize multiple buses.

Network interface subsystem 816 serves as an interface for communicating data between computer system 800 and other computing devices or networks. Embodiments of network interface subsystem 816 can include wired (e.g., coaxial, twisted pair, or fiber optic) and/or wireless (e.g., Wi-Fi, cellular, Bluetooth, etc.) interfaces.

User interface input devices 812 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 800.

User interface output devices 814 can include a display subsystem such as a flat-panel display or non-visual displays such as audio output devices, etc. In general, use of the term "output device" is intended to include all possible types of devices and mechanisms for outputting information from computer system 800.

Storage subsystem 806 includes a memory subsystem 808 and a file/disk storage subsystem 810. Subsystems 808 and 810 represent non-transitory computer-readable storage media that can store program code and/or data that provide the functionality of various embodiments described herein.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than computer system 800 are possible.

The following are some example embodiments of the present disclosure. In some embodiments, a non-transitory machine-readable medium storing a program executable by at least one processing unit of a device, the program comprising sets of instructions for processing a block of data comprising a plurality of rows of data for storage in a row-oriented storage, each row of data in the plurality of rows of data comprising a set of values for a set of attributes; determining a set of unique schemas based on the plurality of rows of data; determining, from the plurality of rows of data, a set of groups of rows of data based on the set of unique schemas; for each group of rows of data in the set of groups of rows of data, storing the group of rows of data in a column-oriented format; and for each group of rows of data in the set of groups of rows of data, applying a set of encoding techniques to values in the group of rows of data based on the sets of attributes of the group of rows of data.

In some embodiments, for a particular group of rows of data in the set of groups of rows of data, storing the particular group of rows of data in the column-oriented format further comprises determining a first data type of values stored in a first attribute in the set of attributes of the particular group of rows of data and determining a second data type of values stored in a second attribute in the set of attributes of the particular group of rows of data. For the particular group of rows of data, applying the set of encoding techniques to the first group of rows of data comprises applying a first encoding technique to the values of the first attribute in the set of attributes and applying a second encoding technique to the values of the second attribute in the set of attributes.

In some embodiments, for a particular group of rows of data in the set of groups of rows of data, applying the set of encoding techniques to values in the group of rows of data comprises determining a data type of values stored in an attribute in the set of attributes of the particular group of rows of data is an integer. For the particular group of rows of data, applying the set of encoding techniques to the particular group of rows of data comprises applying a run-length encoding technique to the values of the attribute in the set of attributes.

In some embodiments, for a particular group of rows of data in the set of groups of rows of data, applying the set of encoding techniques to values in the group of rows of data comprises determining a data type of values stored in an attribute in the set of attributes of the particular group of rows of data is an enumeration. For the particular group of rows of data, applying the set of encoding techniques to the particular group of rows of data comprises applying a dictionary encoding technique to the values of the attribute in the set of attributes.

In some embodiments, for a particular group of rows of data in the set of groups of rows of data, applying the set of encoding techniques to values in the group of rows of data comprises determining a data type of values stored in an attribute in the set of attributes of the particular group of rows of data is a timestamp. For the particular group of rows of data, applying the set of encoding techniques to the particular group of rows of data comprises applying a delta or zigzag encoding technique to the values of the attribute in the set of attributes.

In some embodiments, the row-oriented storage comprises a plurality of files of data. Each file of data in the plurality of files of data comprising a set of blocks of data. Each block of data in the set of blocks of data comprising a set of rows of data. The program further comprises a set of instructions for merging a subset of the plurality of files of data into a particular file of data, the particular file of data comprising a particular set of blocks of data, wherein the particular set of blocks of data includes the block of data.

In some embodiments, merging the subset of the plurality of files of data into the particular file of data comprises generating the block of data by performing the processing of the block of data, the determining of the set of unique schemas, the determining of the set of groups of rows of data, and, for each group of rows of data in the set of groups of rows of data, the storing of the group of rows of data in the column-oriented format are performed.

In some embodiments, the row-oriented storage comprises a plurality of files of data. Each file of data in the plurality of files of data comprising a set of blocks of data. Each block of data in the set of blocks of data comprising a set of rows of data. The program further comprises sets of instructions for receiving a set of modifications to the row-oriented storage; and generating a particular file of data based on the set of modifications to the row-oriented storage, the particular file of data comprising a particular set of blocks of data. The particular set of blocks of data includes the block of data.

In some embodiments, generating the particular file of data comprises generating the block of data by performing the processing of the block of data, the determining of the set of unique schemas, the determining of the set of groups of rows of data, and, for each group of rows of data in the set of groups of rows of data, the storing of the group of rows of data in the column-oriented format are performed.

In some embodiments, the program further comprises sets of instructions for: receiving from a client a request for a particular row of data in the row-oriented storage; determining that the block of data includes the particular row of data; for each group of rows of data in the set of groups of rows of data, applying a set of decoding techniques to the group of rows of data stored in the column-oriented format; for each group of rows of data in the set of groups of rows of data, transforming the decoded group of rows of data stored in the column-oriented format into a row-oriented format; identifying the particular row of data in the groups of rows of data stored in the row-oriented format; and providing the particular row of data to the client.

In some embodiments, a method comprises processing a block of data comprising a plurality of rows of data for storage in a row-oriented storage; determining a set of schemas based on the plurality of rows of data; determining, from the plurality of rows of data, a set of groups of rows of data based on the set of schemas; and for each group of rows of data in the set of groups of rows of data, storing the group of rows of data in a column-oriented format.

In some embodiments, the method further comprises, for each group of rows of data in the set of groups of rows of data, applying a set of encoding techniques to values in the group of rows of data based on the sets of attributes of the group of rows of data.

In some embodiments, the row-oriented storage comprises a plurality of files of data. Each file of data in the plurality of files of data comprising a set of blocks of data. Each block of data in the set of blocks of data comprising a set of rows of data. The method further comprises receiving a set of modifications to the row-oriented storage; and generating a particular file of data based on the set of modifications to the row-oriented storage. The particular file of data comprising a particular set of blocks of data. The particular set of blocks of data includes the block of data.

In some embodiments, generating the particular file of data comprises generating the block of data by performing the processing of the block of data, the determining of the set of unique schemas, the determining of the set of groups of rows of data, and, for each group of rows of data in the set of groups of rows of data, the storing of the group of rows of data in the column-oriented format are performed.

In some embodiments, the set of modifications to the row-oriented storage comprises adding a set of rows of data to the row-oriented data storage.

In some embodiments, the set of modifications to the row-oriented storage comprises modifying a set of rows of data in the row-oriented data storage.

In some embodiments, a system comprises a set of processing units; and a non-transitory machine-readable medium storing instructions that when executed by at least one processing unit in the set of processing units cause the at least one processing unit to process a block of data comprising a plurality of rows of data for storage in a data storage; determine a schema based on the plurality of rows of data; determine, from the plurality of rows of data, a group of rows of data based on the schema; and store, in the data storage, the group of rows of data in a column-oriented format.

In some embodiments, the instructions further cause the at least one processing unit to receive from a client a request for a particular row of data in the row-oriented storage; determine that the block of data includes the particular row of data; for each group of rows of data in the set of groups of rows of data, transform the group of rows of data stored in the column-oriented format into a row-oriented format; identify the particular row of data in the groups of rows of data stored in the row-oriented format; and provide the particular row of data to the client.

In some embodiments, the client is an application.

In some embodiments, the client is a client device.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents will be evident to those skilled in the art and may be employed without departing from the spirit and scope of the disclosure as defined by the claims.

What is claimed is:

1. A non-transitory machine-readable medium storing a program executable by at least one processing unit of a device, the program comprising sets of instructions for:
processing a block of data comprising a plurality of rows of data for storage in a row-oriented storage, each row of data in the plurality of rows of data comprising a set of values for a set of attributes including:
defining a set of unique schemas based on the attributes in the plurality of rows of data;
determining, from the plurality of rows of data, a set of groups of rows of data based on the set of unique schemas, wherein each group of rows comprises rows that are described by a corresponding schema among the set of unique schemas;
for each group of rows of data in the set of groups of rows of data, storing the group of rows of data in a column-oriented format; and
for each group of rows of data in the set of groups of rows of data, applying a set of encoding techniques to a set of columns of values in the group of rows of data based on corresponding data types of the columns of values; and
receiving from a client a request for a particular row of data, and in response thereto:
determining that the block of data includes the particular row of data;
for each group of rows of data in the set of groups of rows of data, applying a set of decoding techniques to the group of rows of data stored in the column-oriented format based on a schema in the set of unique schemas associated with the group of rows;
for each group of rows of data in the set of groups of rows of data, transforming the decoded group of rows of data stored in the column-oriented format into a row-oriented format;
identifying the particular row of data in the groups of rows of data stored in the row-oriented format; and
providing the particular row of data to the client.

2. The non-transitory machine-readable medium of claim 1, wherein, for a particular group of rows of data in the set of groups of rows of data, storing the particular group of rows of data in the column-oriented format further comprises determining a first data type of values stored in a first attribute in the set of attributes of the particular group of rows of data and determining a second data type of values stored in a second attribute in the set of attributes of the particular group of rows of data, wherein, for the particular group of rows of data, applying the set of encoding techniques to the first group of rows of data comprises applying a first encoding technique to the values of the first attribute in the set of attributes and applying a second encoding technique to the values of the second attribute in the set of attributes.

3. The non-transitory machine-readable medium of claim 1, wherein, for a particular group of rows of data in the set of groups of rows of data, applying the set of encoding techniques to values in the group of rows of data comprises determining a data type of values stored in an attribute in the set of attributes of the particular group of rows of data is a number value, wherein, for the particular group of rows of data, applying the set of encoding techniques to the particular group of rows of data comprises applying a run-length encoding technique to the values of the attribute in the set of attributes.

4. The non-transitory machine-readable medium of claim 1, wherein, for a particular group of rows of data in the set of groups of rows of data, applying the set of encoding techniques to values in the group of rows of data comprises determining a data type of values stored in an attribute in the set of attributes of the particular group of rows of data is an enumeration or a string, wherein, for the particular group of rows of data, applying the set of encoding techniques to the particular group of rows of data comprises applying a dictionary encoding technique to the values of the attribute in the set of attributes.

5. The non-transitory machine-readable medium of claim 1, wherein, for a particular group of rows of data in the set of groups of rows of data, applying the set of encoding techniques to values in the group of rows of data comprises determining a data type of values stored in an attribute in the set of attributes of the particular group of rows of data is a timestamp or a numeric value, wherein, for the particular group of rows of data, applying the set of encoding techniques to the particular group of rows of data comprises applying a delta and/or zigzag encoding technique to the values of the attribute in the set of attributes.

6. The non-transitory machine-readable medium of claim 1, wherein the row-oriented storage comprises a plurality of files of data, each file of data in the plurality of files of data comprising a set of blocks of data, each block of data in the set of blocks of data comprising a set of rows of data, wherein the program further comprises a set of instructions for merging a subset of the plurality of files of data into a particular file of data, the particular file of data comprising a particular set of blocks of data, wherein the particular set of blocks of data includes the block of data.

7. The non-transitory machine-readable medium of claim 6, wherein merging the subset of the plurality of files of data into the particular file of data comprises generating the block of data by performing the processing of the block of data, the determining of the set of unique schemas, the determining of the set of groups of rows of data, and, for each group of rows of data in the set of groups of rows of data, the storing of the group of rows of data in the column-oriented format.

8. The non-transitory machine-readable medium of claim 1, wherein the row-oriented storage comprises a plurality of files of data, each file of data in the plurality of files of data comprising a set of blocks of data, each block of data in the set of blocks of data comprising a set of rows of data, wherein the program further comprises sets of instructions for:
receiving a set of modifications to the row-oriented storage; and
generating a particular file of data based on the set of modifications to the row-oriented storage, the particular file of data comprising a particular set of blocks of data, wherein the particular set of blocks of data includes the block of data.

9. The non-transitory machine-readable medium of claim 8, wherein generating the particular file of data comprises generating the block of data by performing the processing of the block of data, the determining of the set of unique schemas, the determining of the set of groups of rows of data, and, for each group of rows of data in the set of groups of rows of data, the storing of the group of rows of data in the column-oriented format are performed.

10. A method comprising:
processing a block of data comprising a plurality of rows of data for storage in a row-oriented storage including:
defining a set of schemas based on the plurality of rows of data;
determining, from the plurality of rows of data, a set of groups of rows of data based on the set of schemas, wherein each group of rows comprises rows that are described by a corresponding schema among the set of unique schemas; and
for each group of rows of data in the set of groups of rows of data, storing the group of rows of data in a column-oriented format; and
receiving from a client a request for a particular row of data in the row-oriented storage, and in response thereto:
determining that the block of data includes the particular row of data;
for each group of rows of data in the set of groups of rows of data, applying a set of decoding techniques to the group of rows of data stored in the column-oriented format based on a schema in the set of unique schemas associated with the group of rows;
for each group of rows of data in the set of groups of rows of data, transforming the decoded group of rows of data stored in the column-oriented format into a row-oriented format;
identifying the particular row of data in the groups of rows of data stored in the row-oriented format; and
providing the particular row of data to the client.

11. The method of claim 10 further comprising, for each group of rows of data in the set of groups of rows of data, applying a set of encoding techniques to values in the group of rows of data based on the sets of attributes of the group of rows of data.

12. The method of claim 10, wherein the row-oriented storage comprises a plurality of files of data, each file of data in the plurality of files of data comprising a set of blocks of data, each block of data in the set of blocks of data comprising a set of rows of data, the method further comprising:
receiving a set of modifications to the row-oriented storage; and
generating a particular file of data based on the set of modifications to the row-oriented storage, the particular file of data comprising a particular set of blocks of data, wherein the particular set of blocks of data includes the block of data.

13. The method of claim 12, wherein generating the particular file of data comprises generating the block of data by performing the processing of the block of data, the determining of the set of unique schemas, the determining of the set of groups of rows of data, and, for each group of rows of data in the set of groups of rows of data, the storing of the group of rows of data in the column-oriented format are performed.

14. The method of claim 12, wherein the set of modifications to the row-oriented storage comprises adding a set of rows of data to the row-oriented data storage.

15. The method of claim 12, wherein the set of modifications to the row-oriented storage comprises modifying a set of rows of data in the row-oriented data storage.

16. A system comprising:
one or more computer processors; and
a non-transitory machine-readable medium storing instructions that when executed by at least one computer processor cause the at least one computer processor to:
process a block of data comprising a plurality of rows of data for storage in a data storage including:
define a schema using one of the plurality of rows of data;
identify a group of rows of data from the plurality of rows of data that are described by the schema; and
store, in the data storage, the group of rows of data in a column-oriented format; and
receiving from a client a request for a particular row of data in the row-oriented storage and in response:
determining that the block of data includes the particular row of data;
for each group of rows of data in the set of groups of rows of data, applying a set of decoding techniques to the group of rows of data stored in the column-oriented format based on a schema in the set of unique schemas associated with the group of rows;
for each group of rows of data in the set of groups of rows of data, transforming the decoded group of rows of data stored in the column-oriented format into a row-oriented format;
identifying the particular row of data in the groups of rows of data stored in the row-oriented format; and
providing the particular row of data to the client.

17. The system of claim 16, wherein the instructions further cause the at least one computer processor to:
receive from a client a request for a particular row of data in the row-oriented storage;
determine that the block of data includes the particular row of data;

for each group of rows of data in the set of groups of rows of data, transform the group of rows of data stored in the column-oriented format into a row-oriented format;
identify the particular row of data in the groups of rows of data stored in the row-oriented format; and
provide the particular row of data to the client.

18. The system of claim 17, wherein the client is an application.

19. The system of claim 17, wherein the client is a client device.

20. The non-transitory machine-readable medium of claim 1, wherein the set of attributes comprises a set of network configuration parameters for configuring a set of network device in a network.

21. The non-transitory machine-readable medium of claim 1, wherein the set of attributes comprises a set of network telemetry attributes associated with operation of a set of network devices in a network.

* * * * *